United States Patent
Bowman et al.

(10) Patent No.: US 6,527,073 B1
(45) Date of Patent: Mar. 4, 2003

(54) DUAL WHEEL ASSEMBLY WITH VARIABLE WHEEL ENGAGEMENT

(75) Inventors: Larry W. Bowman, Troy, MI (US); Richard M. Clisch, Canton, MI (US); Patrick D. Laper, Rochester, MI (US); Raji S. El-Kassouf, Sterling Heights, MI (US); Michael G. Semke, Novi, MI (US); Gary P. Ford, St. Joseph, MI (US); Joseph B. Saxon, Cookeville, TN (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/548,228

(22) Filed: Apr. 12, 2000

(51) Int. Cl.$^7$ ............................................. B62D 61/10
(52) U.S. Cl. ...................... 180/24.03; 180/22; 301/36.2
(58) Field of Search ............................... 180/24.03, 648, 180/6.5, 371, 22; 280/124.126; 301/36.1, 36.2, 6.1, 40.2; 475/348, 151; 188/72.3

(56) References Cited

U.S. PATENT DOCUMENTS

| | | | |
|---|---|---|---|
| 1,975,206 A | | 10/1934 | Fuhrman |
| 2,001,875 A | | 5/1935 | Higbee |
| 2,082,292 A | | 6/1937 | Kendall |
| 2,132,029 A | | 10/1938 | Higbee |
| 2,135,568 A | | 11/1938 | Durham et al. |
| 2,192,023 A | | 2/1940 | Ash |
| 2,222,695 A | * | 11/1940 | Velo ......................... 180/24.03 |
| 2,237,547 A | * | 4/1941 | Castellano ............... 180/24.03 |
| 2,260,828 A | | 10/1941 | Burger |
| 2,267,362 A | | 12/1941 | Ash |
| 2,281,541 A | * | 5/1942 | Ash ......................... 180/24.03 |
| 2,355,133 A | * | 8/1944 | Ash ......................... 180/24.03 |
| 2,397,673 A | | 4/1946 | Lewis |
| 2,398,348 A | | 4/1946 | Ash |
| 2,459,347 A | | 1/1949 | Tolman |
| 2,512,050 A | * | 6/1950 | Ash ......................... 180/24.03 |
| 2,727,582 A | | 12/1955 | Lisenby |
| 2,773,723 A | | 12/1956 | Randall |
| 2,935,278 A | | 5/1960 | Lesley |
| 4,656,890 A | * | 4/1987 | Marquardt ................. 475/348 |
| 5,035,303 A | * | 7/1991 | Sullivan .................... 188/72.3 |
| 5,919,109 A | * | 7/1999 | Fleckenstein ............... 475/151 |

FOREIGN PATENT DOCUMENTS

GB              515057         5/1938

\* cited by examiner

Primary Examiner—Brian L. Johnson
Assistant Examiner—Hau Phan
(74) Attorney, Agent, or Firm—Carlson, Gaskey & Olds

(57) ABSTRACT

A variable engagement mechanism for a dual wheel assembly is provided. The mechanism includes a spindle having a drive axle defining a rotational axis. A first wheel hub is supported on the spindle and coupled to the drive axle for being rotatably driven about the rotational axis. A second wheel hub is arranged adjacent to the first wheel hub and is rotatable relative to the first wheel hub about the rotational axis. Friction members are provided between the first and second wheel hub. An actuator forces the friction members into engagement with one another to permit transfer of torque between the wheel hubs. The actuator may be operator controlled or integrated with a braking or other vehicle control system. In this manner, the first and second wheel hub may be selectively locked together for increased traction and/or braking. A differential assembly may be used between the first and second wheel hubs so that both wheels may be driven at all times while being permitted to rotate relative to one another.

32 Claims, 3 Drawing Sheets

DUAL WHEEL ASSEMBLY WITH VARIABLE WHEEL ENGAGEMENT

BACKGROUND OF THE INVENTION

This invention relates to an axle assembly having multiple wheels at each end of an axle in which one wheel is permitted to rotate relative to the other wheel, and more specifically, the invention relates to a mechanism for locking the wheels together for driving and/or braking both wheels.

Axle assemblies having dual wheels on either end of the axle have been used to increase the load bearing capability of heavy duty vehicles. Typically the pair of wheels on each end of the axle assembly is secured together so that they rotate together about an axis. Some heavy duty vehicles, such as lift trucks, undergo numerous turning maneuvers which wear the tires significantly. The tire wear is caused when the tires scrub, or drag, since the wheels that are secured together must travel different distances at the inside and outside of the turning radius. Tire wear and maintenance on heavy duty lift trucks due to scrub cost thousands of dollars annually per vehicle.

Dual wheel assembly designs have been proposed that permit the wheels to rotate relative to one another to reduce scrubbing during vehicle turns while driving at least one of the wheels to propel the vehicle. Certain driving conditions require that both wheels be driven to provide enough traction to propel the vehicle and its load. Simnilarly, braking force may be required at both wheels to produce sufficient braking force to stop the loaded vehicle. These competing requirements make it difficult to design a dual wheel assembly having all the desired characteristics. Some designs have been developed which utilize a differential gear set between the wheels so that both wheels may be driven. Other designs have provided a second brake assembly slaved off a first brake assembly to provide braking force to both wheels. However, prior art designs do not provide a mechanism that will lock wheels together, which are rotatable relative to one another, for driving and/or braking conditions. Therefore, what is needed is a mechanism that permits the wheels to be selectively locked together to provide increased traction and/or to permit braking force to be applied to both wheels.

SUMMARY OF THE INVENTION AND ADVANTAGES

The present invention provides a variable engagement mechanism for a dual wheel assembly. The mechanism includes a spindle having a drive axle defining a rotational axis. A first wheel hub is supported on the spindle and coupled to the drive axle for being rotatably driven about the rotational axis. A second wheel hub is arranged adjacent to the first wheel hub and is rotatable relative to the first wheel hub about the rotational axis. In one embodiment, the first wheel hub has a support member extending there from along the rotational axis and the second wheel hub is supported on the support member. First and second friction discs are adjacent to one another and splined to the first and the second wheel hubs, respectively. An actuator forces the friction discs into engagement with one another to permit transfer of torque between the wheel hubs. In this manner, the first and second wheel hub may be selectively locked together.

In another embodiment, the second wheel hub includes an interlocking member. An engagement member is splined to the support member to prevent relative rotation there between and is movable relative to the support member along the rotation axis to an engaged position in which the engagement member engages the interlocking member. In the engaged position the first and second wheel hub are coupled together. A first actuator moves the engagement member along the rotational axis to the engaged position for increased traction or braking. Friction discs may be used between the engagement member and a housing supported by the spindle to provide a braking force to both wheel hubs when they are coupled together.

In yet another embodiment, a friction surface is supported on one of the first and the second wheel hubs. A friction member is movable toward the friction surface along a second axis. A biasing member is interposed between the friction member and the other of the one of the first and the second wheel hubs for forcing the friction member against the friction surface and transferring torque between the wheel hubs. The biasing member may be a passive device such as a spring or an actuator such as a hydraulic piston.

In still another embodiment, a differential assembly is interconnected between the first wheel hub and the second wheel hub. The differential assembly includes a gradual locking mechanism movable between unlocked and locked positions. An actuator moves the locking mechanism and locks the first and the second wheel hubs together in the locked position to prevent relative rotation there between. In this manner, both wheels may be driven while the second wheel is permitted to rotate relative to the first wheel. However, the differential may be gradually locked when increased traction or braking is necessary.

Accordingly, the above inventions provide is a mechanism that permits the wheels to be selectively locked together to provide increased traction and/or to permit braking force to be applied to both wheels.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
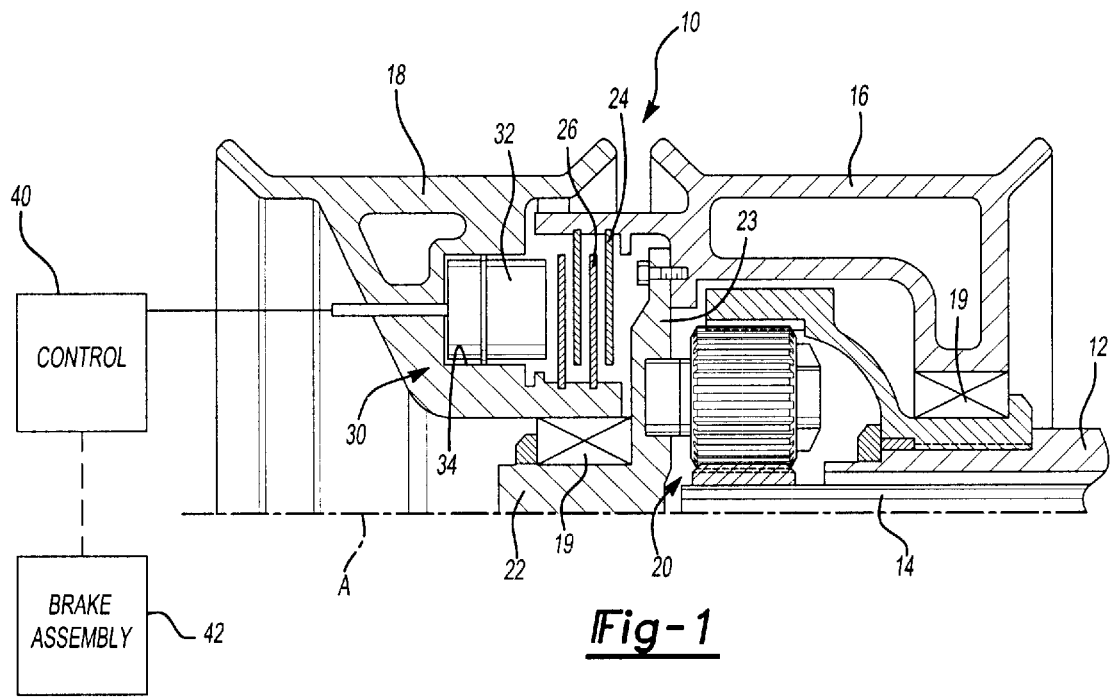
FIG. 1 is a cross-sectional view of a dual wheel assembly of the present invention.

The present invention variable engagement mechanisms 10 shown in the Figures are adapted for dual wheel assemblies. Each mechanism 10 includes a spindle 12 having a drive axle 14 disposed therein that defines a rotational axis A. A first wheel hub 16 is supported on the spindle 12 for rotation about axis A. A second wheel hub 18 is adjacent to the first wheel hub 16 and is relatively rotatable thereto about axis A. The second wheel hub 18 may be supported by the spindle 12 or some other component in the mechanism 10. Bearing assemblies 19 support the wheel hubs 16, 18. Depending on the arrangement that is desired for the particular application, either the first wheel hub 16 or the second wheel hub 18 may be coupled to the drive axle 14. Typically, the dual wheel assemblies incorporated a gear reduction assembly 20, for example a planetary gear set, to provide increased torque for heavy load applications, such as lift trucks. However, it is to be understood that the present invention may be used without the gear reduction assembly 20.

In one embodiment of the present invention, shown in FIG. 1, the first wheel hub 16 is coupled to the drive axle 14 and is rotatably driven about the rotational axis A. The first wheel hub 16 has a support member 22 extending there from along the rotational axis A. Specifically, the support member 22 is a nose that extends from the planetary gear set spider 23. The second wheel hub 18 is supported on the support member 22 adjacent to the first wheel hub 16 and is normally undriven. First 24 and second 26 friction discs, which are adjacent to one another in alternating relationship, are splined to the first 16 and the second 18 wheel hubs, respectively. An actuator 30, which may include a piston 32 and cylinder 34, is used to force the friction discs 24, 26 into engagement with one another to permit transfer of torque between the wheel hubs 16, 18.

The actuator 30 may be actuated in any known manner, such as pneumatically. If the actuator 30 rotates with a wheel hub, as shown, known central tire inflation technology may be used to pneumatically actuate the actuator 30. A control unit 40 is coupled to the actuator 30 to lock and unlock the first 16 and second 18 wheel hubs. The control unit 40 may be part of a brake unit 42, in which the hubs 16, 18 are locked together when the vehicle brakes are actuated. Alternatively, the control unit 40 may be driver controlled so that the driver may lock the hubs 16, 18 together for increased traction and braking when needed, and unlock the hubs 16, 18 during maneuvers that would cause tire scrub.

Figure 2:
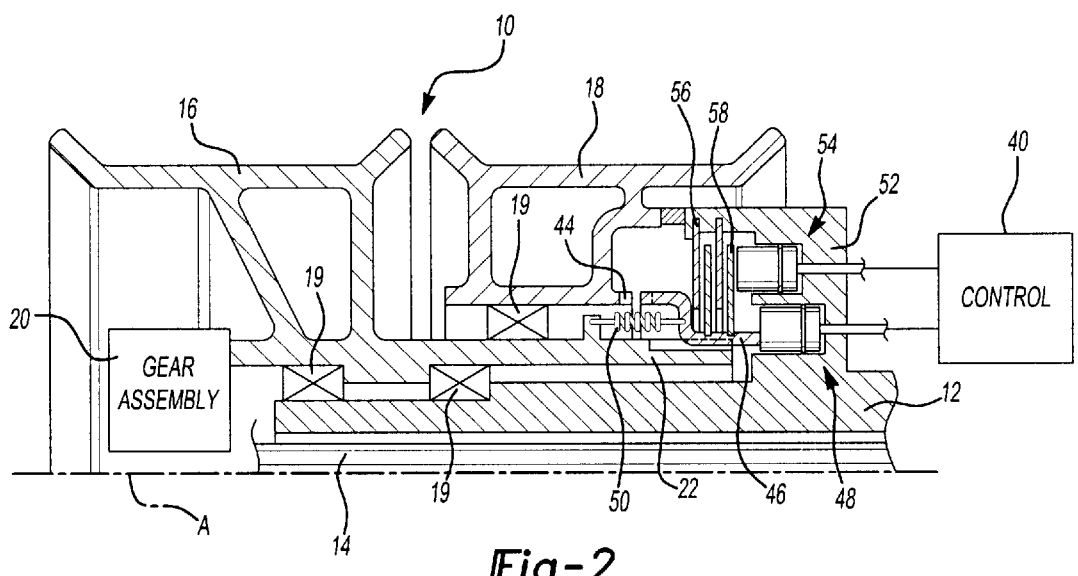
FIG. 2 is a cross-sectional view of a second embodiment of the dual wheel assembly of the present invention.

Another embodiment of the present invention is shown in FIG. 2. The first wheel hub 16 has a support member 22 extending there from, and the second wheel hub 18 is supported on the support member 22. The second wheel hub 18 is normally undriven and rotatable relative to the first wheel hub 16 about the rotational axis A. The second wheel hub 18 includes an interlocking member 44. An engagement member 46 is splined to the support member 22 to prevent relative rotation between the members 44, 46 while permitting the engagement member 46 to move relative to the support member 22 along the rotation axis A. Preferably, the interlocking member 44 includes a plurality of teeth and the engagement member 46 is a dog clutch engageable with the teeth.

A first actuator 48 moves the engagement member 46 to an engaged position in which the engagement member 46 engages the interlocking member 44 for coupling the first 16 and second 18 wheel hubs together. In this, manner traction may be increased by locking the hubs 16, 18 together. The first actuator 48 may be a dual acting piston actuatable between the engaged and disengaged positions. Alternatively, a return spring 50 may be used to move the engagement member 46 to the disengaged position.

A housing 52 is supported by the spindle 12 with a second actuator 54 disposed within the housing 52. The first actuator 48 may also be disposed within the housing 52, as shown in the Figure. First 56 and second 58 friction discs, which are arranged adjacent to one another, are splined to the housing 52 and the engagement member 46, respectively. The second actuator 54 forces the friction discs 56, 58 into engagement with one another in a brake position for braking the first wheel hub 16. When the hubs 16, 18 are locked together by the interlocking member 44 and the engagement member 46, actuating the second actuator 54 will brake both hubs 16, 18.

The control device 40 may be connected to both the first 48 and second 54 actuators or only one of the actuators. In one method of operation, the first 48 and second 54 actuator may be actuated together when the brakes are actuated so that maximum braking force is applied. In another method of operation, the first actuator 48 may be actuated by the driver independently of the second actuator 54 so that the vehicle will have maximum traction force.

Figure 3:
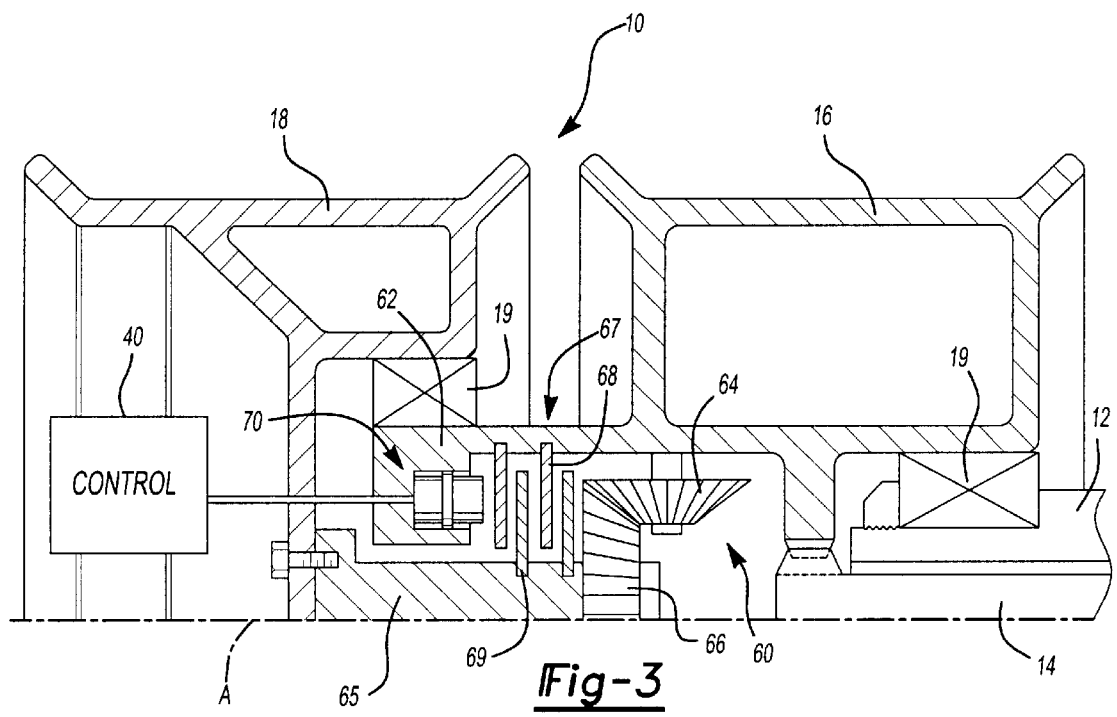
FIG. 3 is a cross-sectional view of a third embodiment of the dual wheel assembly of the present invention.

Referring now to FIG. 3, an embodiment of the present invention is shown having the first wheel hub 16 supported on the spindle 12 and coupled to the drive axle 14 for being rotatably driven about the rotational axis A. The second wheel hub 18 is adjacent to the first wheel hub 16 and is rotatable relative to the first wheel hub 16 about the rotational axis A. Although a gear reduction assembly is not shown between the hubs 16, 18, one may be used.

A differential assembly 60 is interconnected between the hubs 16, 18. Any locking differential arrangement may be used. In the embodiment shown, the differential assembly 60 includes a differential gear carrier 62 supported on the first wheel hub 16. A first differential gear 64 is supported in the carrier 62 transverse to the axis A. A second differential gear 66 is engaged with first differential gear 64 and is supported on a shaft 65 that is coaxial with axis A. The shaft 65 is connected to the second wheel hub 18 so that as the second differential gear 66 is driven the second wheel hub 18 is rotated. As a result, when the vehicle travels in a straight path, both hubs 16, 18 are driven and maximum traction force is provided. However, the differential assembly 60 permits the hubs 16, 18 to rotate relative to one another so that scrub is reduced.

The differential assembly 60 has a locking mechanism 67 that includes first 68 and second 69 friction discs adjacent to one another and splined to the carrier 62 and the second differential gear 66 via shaft 65. The locking mechanism 67 further includes an actuator 70, which is movable between unlocked and locked positions. The actuator 70 forces the friction discs 68, 69 into engagement with one another to the locked position. In this manner, the hubs 16, 18 are not permitted to rotate relative to one another during a turn so that maximum traction or braking force may be provided. The control device 40 may be configured to permit the driver to selectively actuate the actuator 70.

Figure 4:
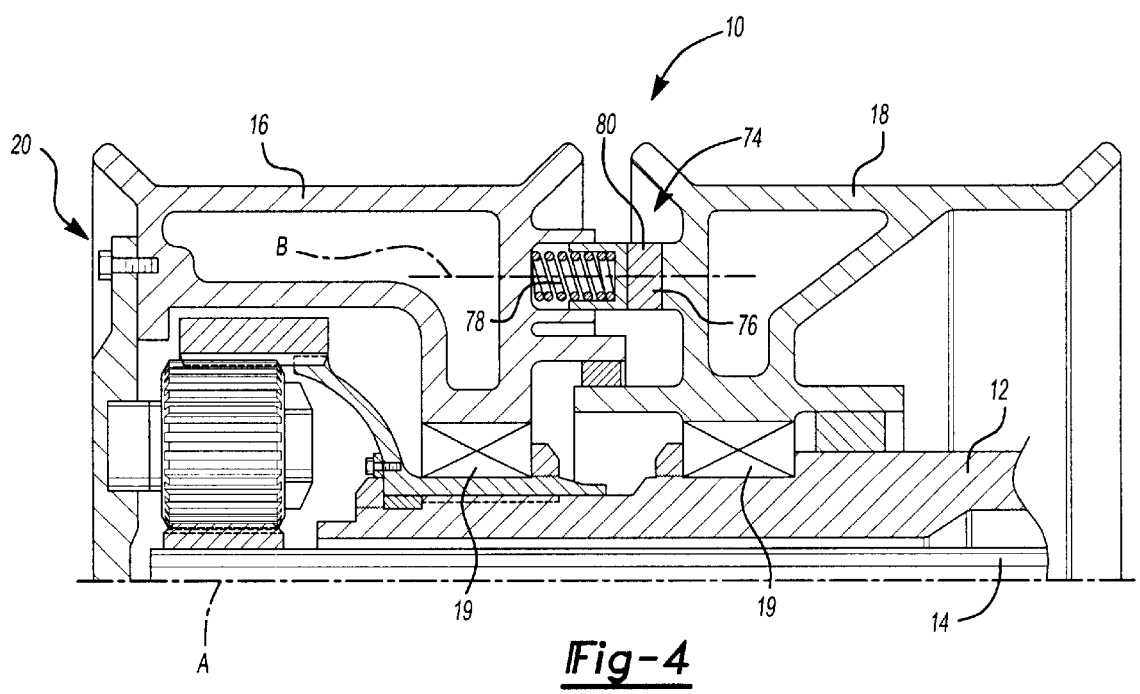
FIG. 4 is a cross-sectional view of a fourth embodiment of the dual wheel assembly of the present invention.

Turning now to FIG. 4, a passive locking mechanism 74 is shown. The wheel hubs 16, 18 are supported on the spindle 12. An annular friction surface 76 is supported on one of the wheel hubs 16, 18, such as hub 18. A biasing member 78, such as a spring, is supported by the other wheel hub, which is hub 16 as shown, and forces a friction member 80 into engagement with the friction surface 76. Preferably, the friction member 80 moves along a second axis B that is parallel to the rotational axis A. The biasing member 78 generates enough force so that the hubs 16, 18 are locked together when the vehicle is travelling in a straight path. When the vehicle turns sharply and the tires would otherwise scrub, the resilient member 78 permits the hubs 16, 18 to rotate relative to one another. The passive locking mechanism 74 permits the transfer of torque between the wheel hubs 16, 18 without any driver interaction.

Figure 5:
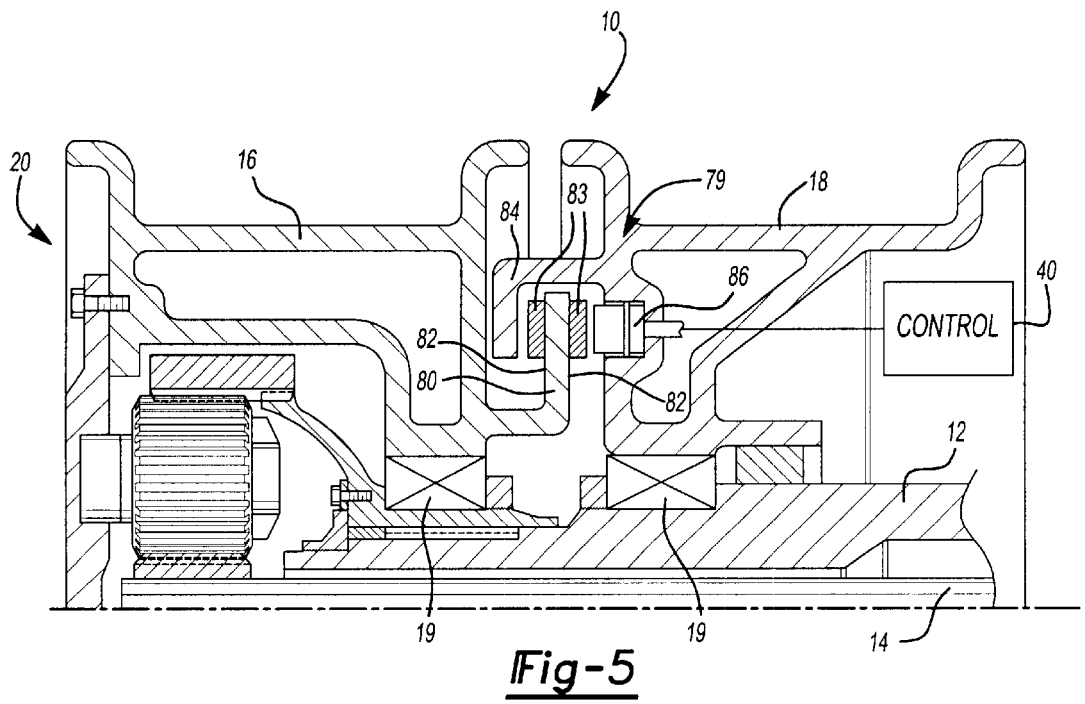
FIG. 5 is a cross-sectional view of a fifth embodiment of the dual wheel assembly of the present invention.
Figure 6:
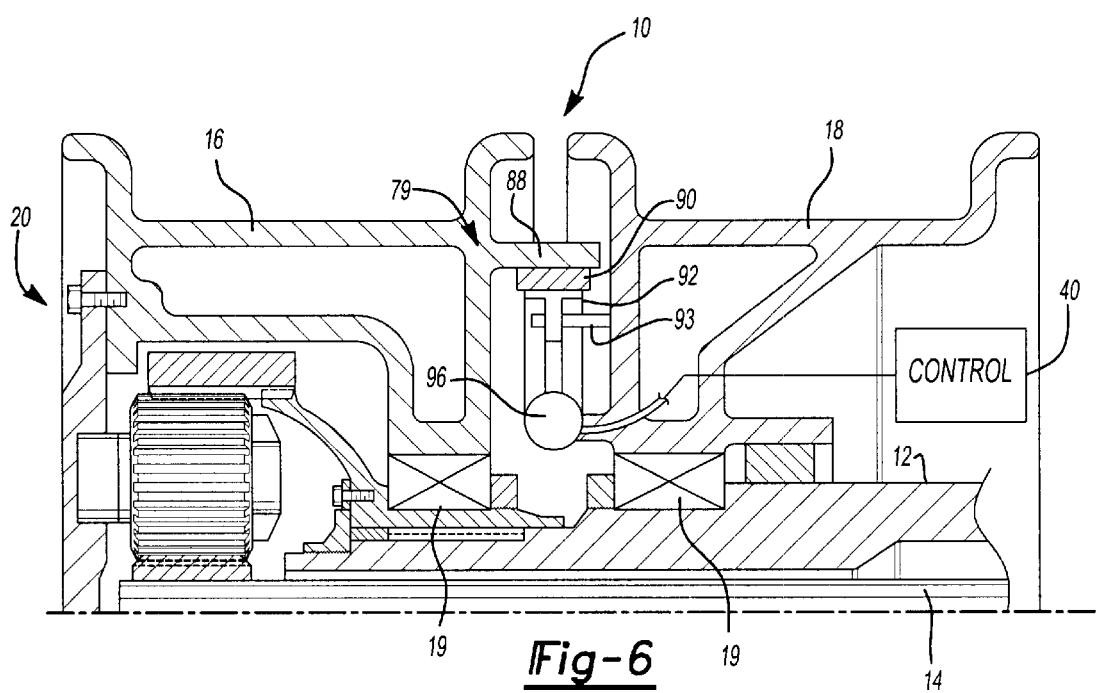
FIG. 6 is a cross-sectional view of a sixth embodiment of the dual wheel assembly of the present invention.

FIGS. 5 and 6 depict active locking mechanisms 79. The wheel hubs 16, 18 are arranged in a manner similar to FIG. 4. Referring to FIG. 5, which uses a rotor-type configuration, the first wheel hub 16 includes a rotor 80 having opposing faces 82 that provide friction surfaces. Friction pads 83 are adjacent to each face 82 and are supported in a caliper 84 which is supported on the second wheel hub 18. A biasing member 86, such as a pneumatic, hydraulic, or other actuator, is movable between engaged and disengaged positions. Central tire inflation technology may be adapted to actuate the actuator 86 if needed. The actuator 86 preferably includes a piston for forcing the friction pads 83 into engagement with the rotor 80 in the engaged position for transferring torque between the wheel hubs 16, 18. As with the other embodiments of the present invention, the control device 40 permits a vehicle operator to selectively actuate the actuator 86. Therefore, the hubs may be locked together to increase traction and/or braking force to the hubs 16, 18.

Referring to FIG. 6, which uses a drum-type configuration as an alternative to the rotor-type shown in FIG. 5, the first hub 16 supports a drum 88 that has a friction surface 90. Brake shoes 92 (only one shown) are each supported by a pin 93 that extends from the second wheel hub 18. An actuator 96 is disposed between the brake shoes 93 for pivoting the brake shoes 92 about pins 93 and forcing the brake shoes 93 into engagement with the drum 88 in the engaged position to transferring torque between the wheel hubs 16, 18. The control device 40 permits a vehicle operator to selectively actuate the actuator 96 for situations in which increased traction and/or braking force is desired.

The invention has been described in an illustrative manner, and it is to be understood that the terminology that has been used is intended to be in the nature of words of description rather than of limitation. Obviously, many modifications and variations of the present invention are possible in light of the above teachings. For example, the components may be rearranged in a manner other that shown in the Figures. It is, therefore, to be understood that within the scope of the appended claims the invention may be practiced otherwise than as specifically described.

What is claimed is:

1. A variable engagement mechanism for a dual wheel assembly, said mechanism comprising:
    a spindle having a drive axle defining a rotational axis;
    a first wheel hub supported on said spindle and coupled to said drive axle for being rotatably driven about said rotational axis, said first wheel hub having a support member extending there from along said rotational axis;
    a second wheel hub supported on said support member adjacent to said first wheel hub, said second wheel hub being normally undriven and rotatable relative to said first wheel hub about said rotational axis;
    first and second friction discs splined to said first and said second wheel hubs, respectively, said friction discs adjacent to one another; and
    an actuator for forcing said friction discs into engagement with one another to permit transfer of torque between said wheel hubs.

2. The mechanism according to claim 1, wherein said support member comprises a nose extending from said first wheel hub.

3. The mechanism according to claim 2, wherein said mechanism further comprises a planetary gear assembly interconnecting said drive axle and said first wheel hub, said planetary gear assembly including a portion comprising said nose.

4. The mechanism according to claim 3, wherein said planetary gear assembly includes a spider for carrying planetary gears, said spider including said nose.

5. The mechanism according to claim 1, wherein said mechanism further comprises a control device for selectively actuating said actuator, said control device being a portion of a brake assembly for braking said second wheel hub when said brake assembly brakes said first wheel hub for improved braking.

6. The mechanism according to claim 1, wherein said mechanism further comprises a control device for selectively actuating said actuator, said control device being independently actuatable from a brake assembly by a vehicle operator for locking said first and second wheel hubs together for improved traction.

7. The mechanism according to claim 1, wherein said actuator is a fluid actuated piston movable in a linear direction within a cylinder.

8. The mechanism according to claim 7, wherein said direction is parallel with said rotational axis.

9. The mechanism according to claim 7, wherein said actuator is pneumatic.

10. The mechanism according to claim 7, wherein said actuator is hydraulic.

11. The mechanism according to claim 1, wherein said second wheel hub includes a shaft extending therefrom and said first wheel hub includes a carrier extending therefrom spaced from said shaft with said friction discs arranged therebetween.

12. The mechanism according to claim 11, wherein a differential is arranged between said shaft and said first wheel hub.

13. A method of braking a dual wheel assembly with independently rotatable wheels comprising the steps of:
    a) providing a first wheel hub supported on a spindle and a second wheel hub supported on a support member on the first wheel hub, the second wheel hub being rotatable relative to the first wheel hub, and a hub locking member arranged between the first and second wheel hubs, respectively; and
    b) actuating a fluid operated piston linearly; and
    c) moving the hub locking member to a position in which the hub locking member is engaged to lock the first and the second wheel hubs.

14. The method according to claim 13, wherein the hub locking member is an engagement member splined to one of the wheel hubs and step c) includes moving the engagement member toward another of the wheel hubs to couple the wheel hubs together.

15. The method according to claim 14, wherein the second wheel hub and the engagement member each include a plurality of teeth engageable with one another.

16. The method according to claim 14, wherein the first wheel hub is driven and the second wheel hub is normally undriven.

17. The method according to claim 14, wherein step a) includes providing first and second friction discs adjacent to one another respectively splined to a housing supported on the spindle and the hub locking member, and the hub locking member is splined to the support member, and further including the step of:
    d) moving the friction discs toward one another to a brake position.

18. The method according to claim 17, wherein steps c) and d) occur simultaneously.

19. The method according to claim 17, wherein steps c) and d) occur independently.

20. The method according to claim 13, wherein the locking hub member is first and second friction discs respectively splined to the first and second wheel hubs, and step c) includes moving the discs toward one another.

21. A variable engagement mechanism for a dual wheel assembly, said mechanism comprising:
- a spindle having a drive axle defining a rotational axis;
- a first wheel hub supported on said spindle and coupled to said drive axle for being rotatably driven about said rotational axis, said first wheel hub having a support member extending there from along said rotational axis;
- a second wheel hub supported on said support member adjacent to said first wheel hub, said second wheel hub being normally undriven and rotatable relative to said first wheel hub about said rotational axis;
- first and second friction discs splined to said first and said second wheel hubs, respectively, said friction discs adjacent to one another; and
- an actuator including a fluid piston received in a cylinder and movable linearly therein for forcing said friction discs into engagement with one another to permit transfer of torque between said wheel hubs.

22. The mechanism according to claim 21, wherein said support member comprises a nose extending from said first wheel hub.

23. The mechanism according to claim 22, wherein said mechanism further comprises a planetary gear assembly interconnecting said drive axle and said first wheel hub, said planetary gear assembly including a portion comprising said nose.

24. The mechanism according to claim 23, wherein said planetary gear assembly includes a spider for carrying planetary gears, said spider including said nose.

25. The mechanism according to claim 21, wherein said mechanism further comprises a control device for selectively actuating said actuator, said control device being a portion of a brake assembly for braking said second wheel hub when said brake assembly brakes said first wheel hub for improved braking.

26. The mechanism according to claim 21, wherein said mechanism further comprises a control device for selectively actuating said actuator, said control device being independently actuatable from a brake assembly by a vehicle operator for locking said first and second wheel hubs together for improved traction.

27. The mechanism according to claim 21, wherein said actuator is a fluid actuated piston movable in a linear direction within a cylinder.

28. The mechanism according to claim 27, wherein said direction is parallel with said rotational axis.

29. The mechanism according to claim 27, wherein said actuator is pneumatic.

30. The mechanism according to claim 27, wherein said actuator is hydraulic.

31. The mechanism according to claim 21, wherein said second wheel hub includes a shaft extending therefrom and said first wheel hub includes a carrier extending therefrom spaced from said shaft with said friction discs arranged therebetween.

32. The mechanism according to claim 31, wherein a differential is arranged between said shaft and said first wheel hub.

* * * * *